Patented Apr. 23, 1940

2,198,046

UNITED STATES PATENT OFFICE 2,198,046

PROCESS OF PRODUCING ESTERS AND ETHERS

Karl Vierling, Ludwigshafen - on - the - Rhine, Germany, assignor to I. G. Farbenindustrie Aktiengesellschaft, Frankfort - on - the - Main, Germany No Drawing. Application January 27, 1937, Serial No. 122,567. In Germany January 31, 1936

7 Claims. (Cl. 260—614)

The present invention relates to a process of producing esters or ethers.

I have found that industrially valuable esters or ethers are obtained in a simple manner by causing hydrocarbons which contain at least one olefinic double bond, or substitution products thereof to react with carboxylic acids or alcohols at an elevated temperature under superatmospheric pressure, boron trifluoride being used as a catalyst. The latter is preferably used in the presence of metals, such as nickel, silver and, more particularly, copper or its compounds.

The reaction is carried out with advantage in pressure-tight vessels having copper linings, but any other vessel may as well be used, copper being then added, if necessary, in any appropriate form. In addition to boron trifluoride other boron compounds as for example boric anhydride may be added to the reaction mixture, if desired. When preparing ethers it is frequently advantageous also to add an alkali metal hydroxide, alkali metal carbonate or other substances having an alkaline action.

The reaction is preferably carried out at temperatures of between 80° and 200° C., advantageously between 90° and 125° C. Temperatures exceeding 300° C. should be avoided. The pressure applied should be in essential excess of atmospheric pressure and preferably exceeds 10 atmospheres; the pressure most suitable for each particular performance of the reaction depends on the other reaction conditions, as for example the temperature and the kind of the starting materials. For example when employing olefines having a higher molecular weight the most suitable pressures are not so high as those required when employing olefines having a lower molecular weight. Generally speaking, the reaction is carried out preferably under pressures of between 40 and 60 atmospheres.

Suitable starting materials are any desired carboxylic acids, for example acetic acid, butyric acid, palmitic acid, montanic acid, abietic acid, lactic acid, chloracetic acid, succinic acid, maleic acid, benzoic acid, phthalic acid, sulphophthalic acid, naphthoic acid, chlorobenzoic acid and the like, and any mono- or polyvalent alcohols the hydroxyl group of which is bound to an aliphatic or cycloaliphatic carbon atom, especially aliphatic alcohols, such as ethyl alcohol, butyl alcohol, glycol, diglycol, dodecyl alcohol, stearyl alcohol, ethylenechlorhydrine, or abietinol and cyclohexanol, or benzyl alcohol.

Among the olefinic hydrocarbons suitable for the present process, as well as their substitution products I may mention, for example, ethylene, propylene, isobutylene, trimethylethylene, dodecylene and mixtures of aliphatic olefines, cyclohexene, butadiene, 1.4-dibrombutadiene, styrol, chlorstyrol, chlorcyclohexene and the like.

The following examples will further illustrate how the present invention is carried out in practice, but the invention is not restricted to these examples. The parts are by weight.

Example 1

300 parts of propylene are pressed into a mixture, contained in a copper bomb, of 500 parts of phthalic acid, 1 part of boric acid anhydride and 5 parts of boron trifluoride, the mixture being heated to 100° C. After about 6 hours the propylene has been converted. The unspent phthalic acid and the phthalic acid monoisopropyl ester formed are removed from the reaction mixture by treatment with soda solution, the diisopropyl ester of phthalic acid thus being obtained in a yield of 84 per cent.

Example 2

100 parts of propylene are pressed into a mixture of 250 parts of stearic acid and 2 parts of boron trifluoride contained in a copper bomb. After 8 hours' heating at 110° C., 80 per cent of the stearic acid applied have been converted into the isopropyl ester of stearic acid. It may be purified in the manner described in Example 1.

Example 3

400 parts of propylene are pressed into a mixture of 500 parts of glacial acetic acid, 2 parts of copper turnings and 5 parts of boron trifluoride, contained in an autoclave, and the mixture is heated for 6 hours at 150° C. The isopropyl ester of acetic acid is thus obtained in a yield of 50 per cent. The reaction may be carried out in a similar manner by replacing the propylene by an equivalent amount of octadecene (obtainable by splitting off water from stearyl alcohol) or dibrombutadiene.

Example 4

800 parts of propylene are pressed into a mixture of 100 parts of glycol, 10 parts of boric acid anhydride and 5 parts of boron trifluoride, contained in a copper bomb. The mixture is heated for 8 hours at 120° C. Glycolmonopropyl ether and glycoldipropyl ether are formed in good yields besides small amounts of diglycolpropyl ethers.

Example 5

500 parts of propylene are pressed into a mixture of 1000 parts of butanol, 10 parts of boric acid anhydride and 5 parts of boron trifluoride, contained in an autoclave, the mixture being heated at 100° C. for 10 hours. Butylpropyl ether is thus obtained in good yields. The procedure is similar if, instead of propylene, ethylene, amylene, isobutylene or another hydrocarbon of the olefinic series be employed.

Example 6

1200 parts of propylene are pressed into a mixture of 3000 parts of diglycol, 15 parts of potassium hydroxide and 30 parts of boron trifluoride, contained in a copper bomb, this mixture being heated at 150° C. for 8 hours. Diglycoldipropyl ether is obtained in a good yield in addition to small amounts of diglycolmonopropyl ether.

What I claim is:

1. In the process for the production of ethers the step which comprises subjecting an alcohol to the action of a member of the group consisting of olefines and halogen substituted olefines at temperatures above 80° C. but not exceeding 300° C. and under a pressure between about 10 and about 60 atmospheres and in contact with boron trifluoride and a metal selected from the class consisting of copper, nickel and silver.

2. In the process for the production of ethers the step which comprises subjecting an alcohol to the action of an olefine at temperatures above 80° C. but not exceeding 300° C. and under a pressure between about 10 and about 60 atmospheres and in contact with boron trifluoride and a metal selected from the class consisting of copper, nickel and silver.

3. In the process for the production of ethers the step which comprises subjecting an alcohol to the action of an olefine at temperatures above 80° C. but not exceeding 300° C. and under a pressure between about 10 and about 60 atmospheres and in contact with boron trifluoride and copper.

4. In the process for the production of ethers the step which comprises subjecting an alcohol to the action of an olefine at temperatures from about 80° C. to about 200° C. and under a pressure between about 10 and about 60 atmospheres and in contact with boron trifluoride and copper.

5. In the process for the production of ethers the step which comprises subjecting an alcohol to the action of propylene at temperatures above 80° C. but not exceeding 300° C. and under a pressure between about 10 and about 60 atmospheres and in contact with boron trifluoride and copper.

6. In the production of aliphatic ethers the step which comprises subjecting an aliphatic alcohol to the action of propylene at temperatures above 80° C. but not exceeding 300° C. and under a pressure between about 10 and about 60 atmospheres and in contact with boron trifluoride and copper.

7. In the production of ethylene glycol propyl ethers the step which comprises subjecting ethylene glycol to the action of propylene at temperatures above 80° C. but not exceeding 300° C. and under a pressure between about 10 and about 60 atmospheres and in contact with boron trifluoride and copper.

KARL VIERLING.